Nov. 1, 1938.  R. H. LAWSON ET AL  2,135,185
PATTERN MECHANISM FOR KNITTING
Filed Nov. 17, 1933   8 Sheets-Sheet 1

INVENTORS:
ROBERT H. LAWSON,
BY ARTHUR N. CLOUTIER,
Roy F. Lovell
ATTORNEY.

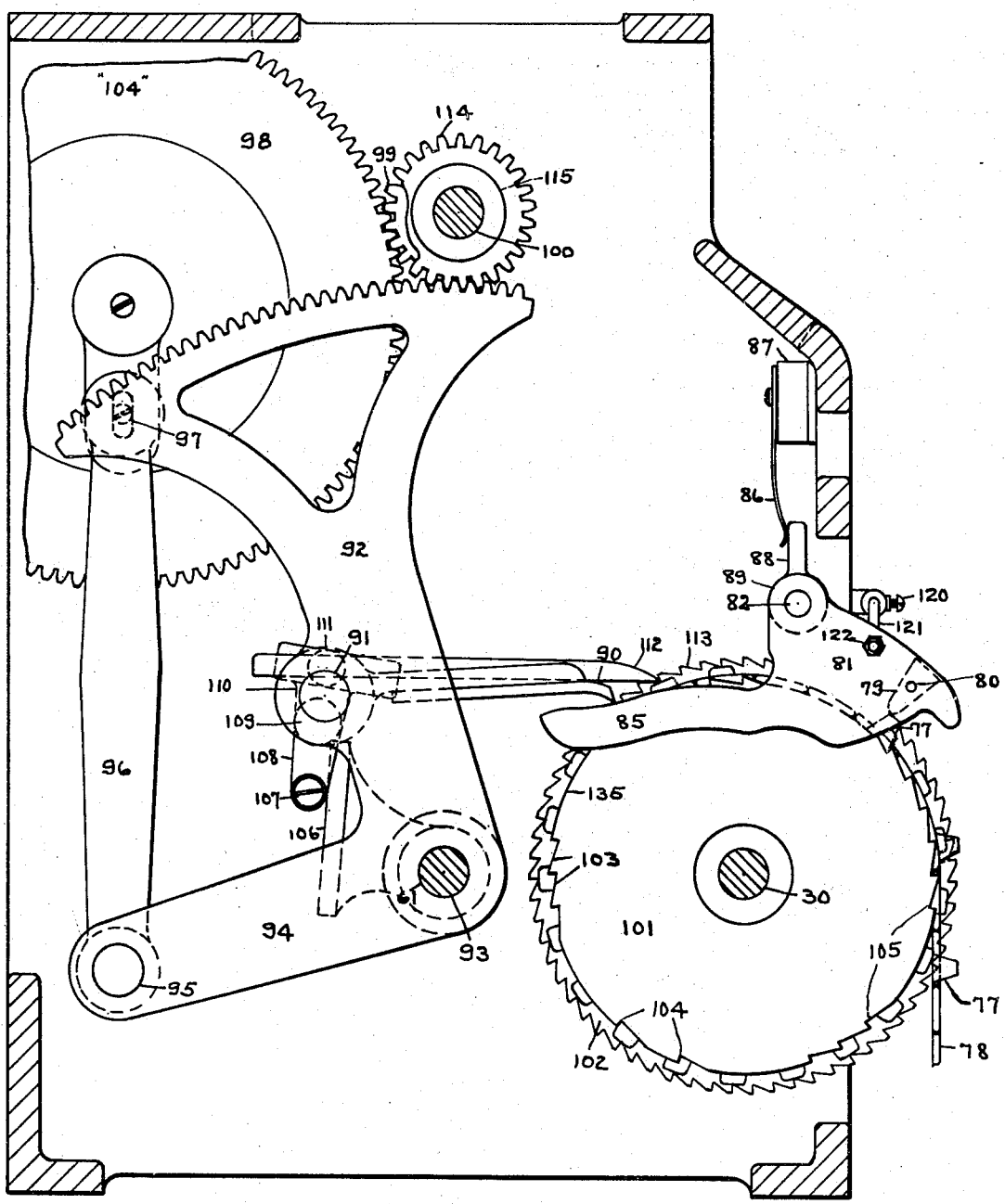

Nov. 1, 1938.  R. H. LAWSON ET AL  2,135,185
PATTERN MECHANISM FOR KNITTING
Filed Nov. 17, 1930  8 Sheets-Sheet 3
FIG. 5.
FIG. 3.
FIG. 4.
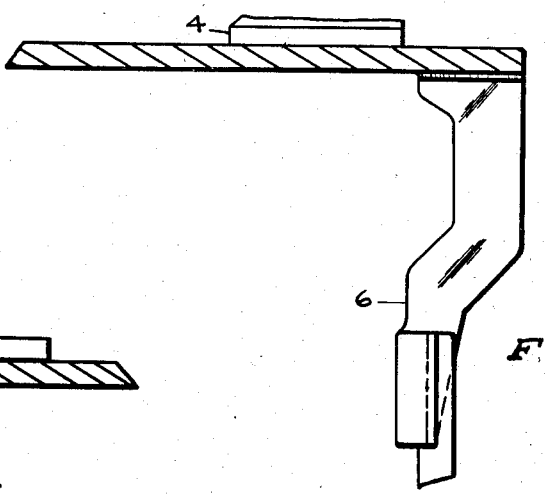
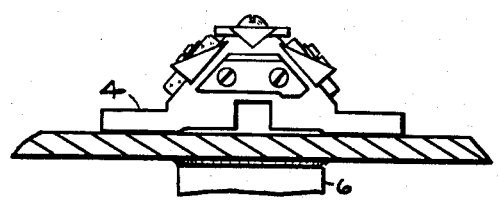
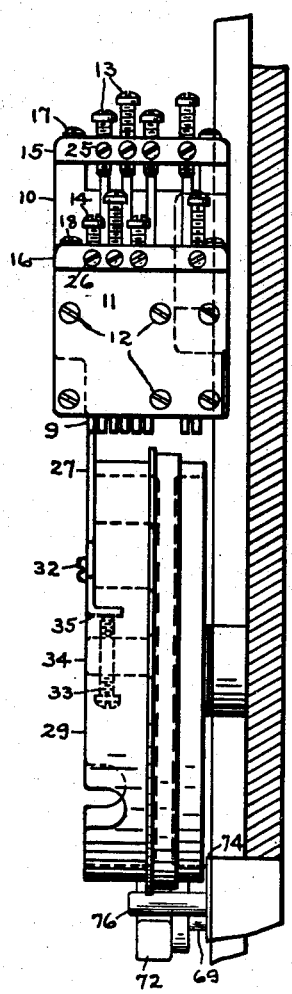
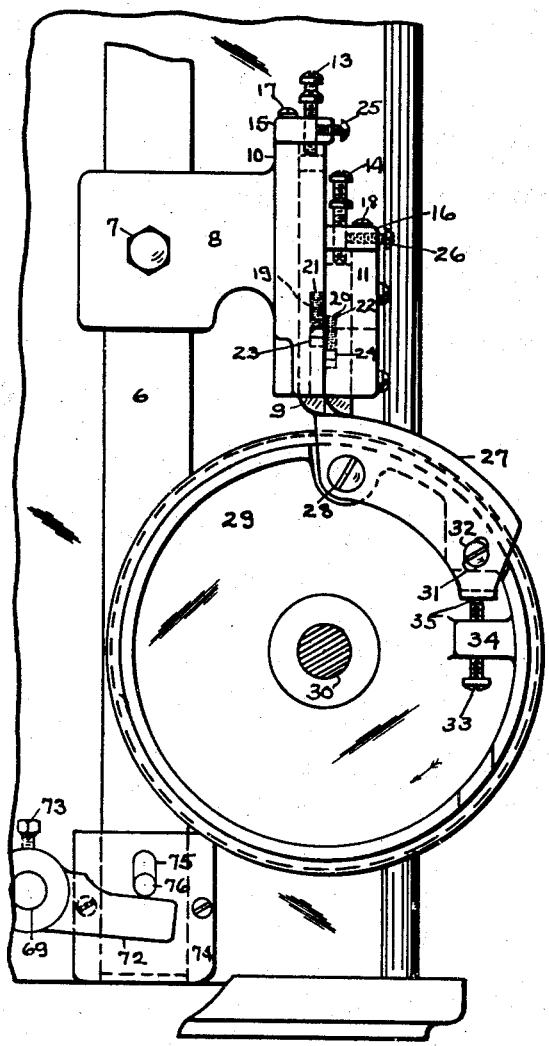
INVENTORS:
ROBERT H. LAWSON,
BY ARTHUR N. CLOUTIER,
Roy F. Lovell,
ATTORNEY.

Nov. 1, 1938.  R. H. LAWSON ET AL  2,135,185
PATTERN MECHANISM FOR KNITTING
Filed Nov. 17, 1930  8 Sheets-Sheet 4
FIG.6. FIG.19.
FIG.7.
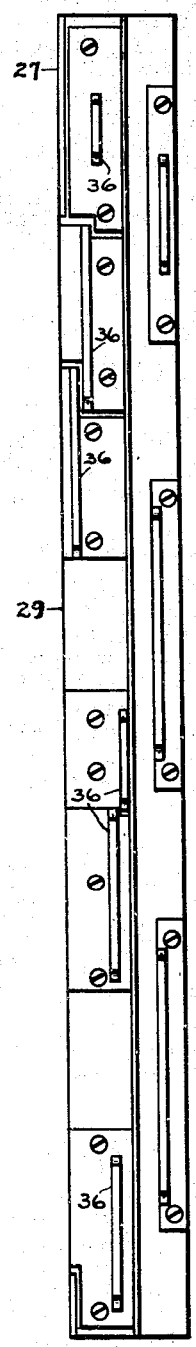
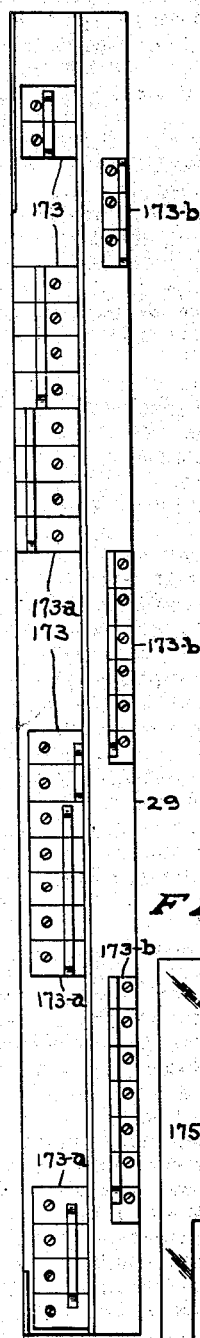
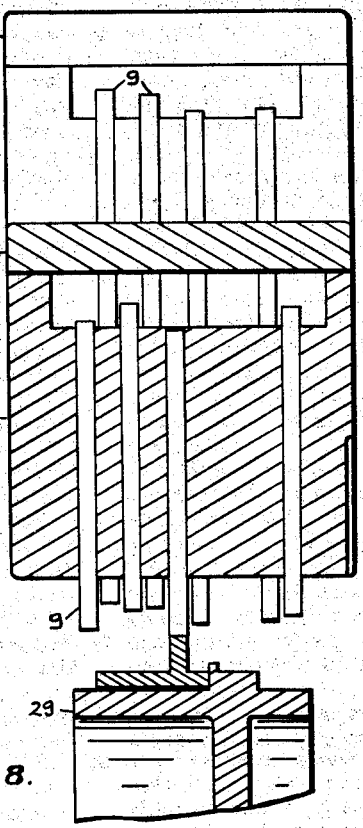
FIG.18.
FIG.17.
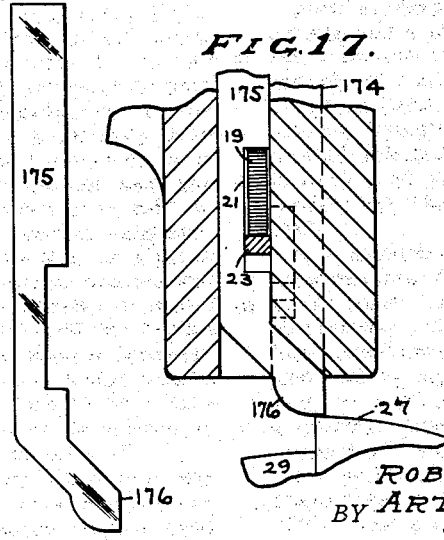
INVENTORS:
ROBERT H. LAWSON,
ARTHUR N. CLOUTIER,
BY Roy F. Lovell,
ATTORNEY.

Nov. 1, 1938.  R. H. LAWSON ET AL  2,135,185
PATTERN MECHANISM FOR KNITTING
Filed Nov. 17, 1930    8 Sheets-Sheet 5
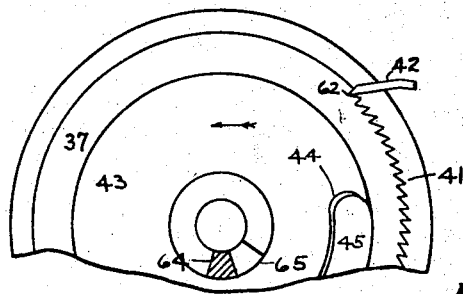
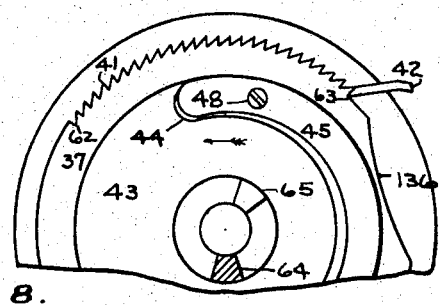
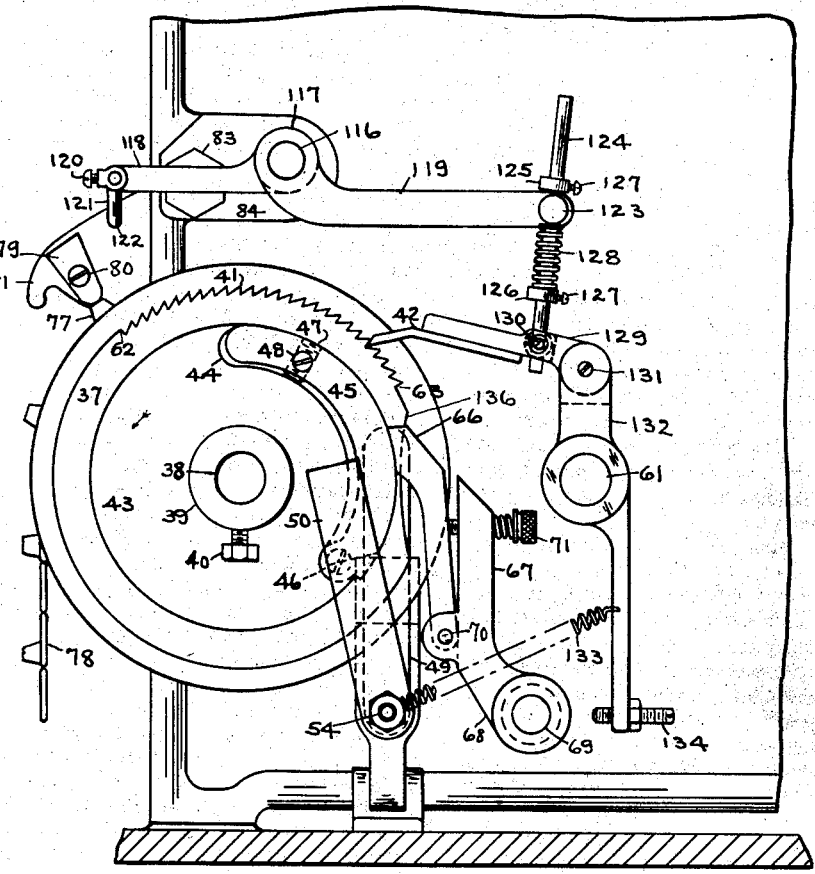
INVENTORS:
ROBERT H. LAWSON,
BY ARTHUR N. CLOUTIER,
Roy F. Lovell,
ATTORNEY.

Nov. 1, 1938.   R. H. LAWSON ET AL   2,135,185
PATTERN MECHANISM FOR KNITTING
Filed Nov. 17, 1930   8 Sheets-Sheet 6

INVENTORS:
ROBERT H. LAWSON,
BY ARTHUR N. CLOUTIER,
Roy F. Lovell,
ATTORNEY.

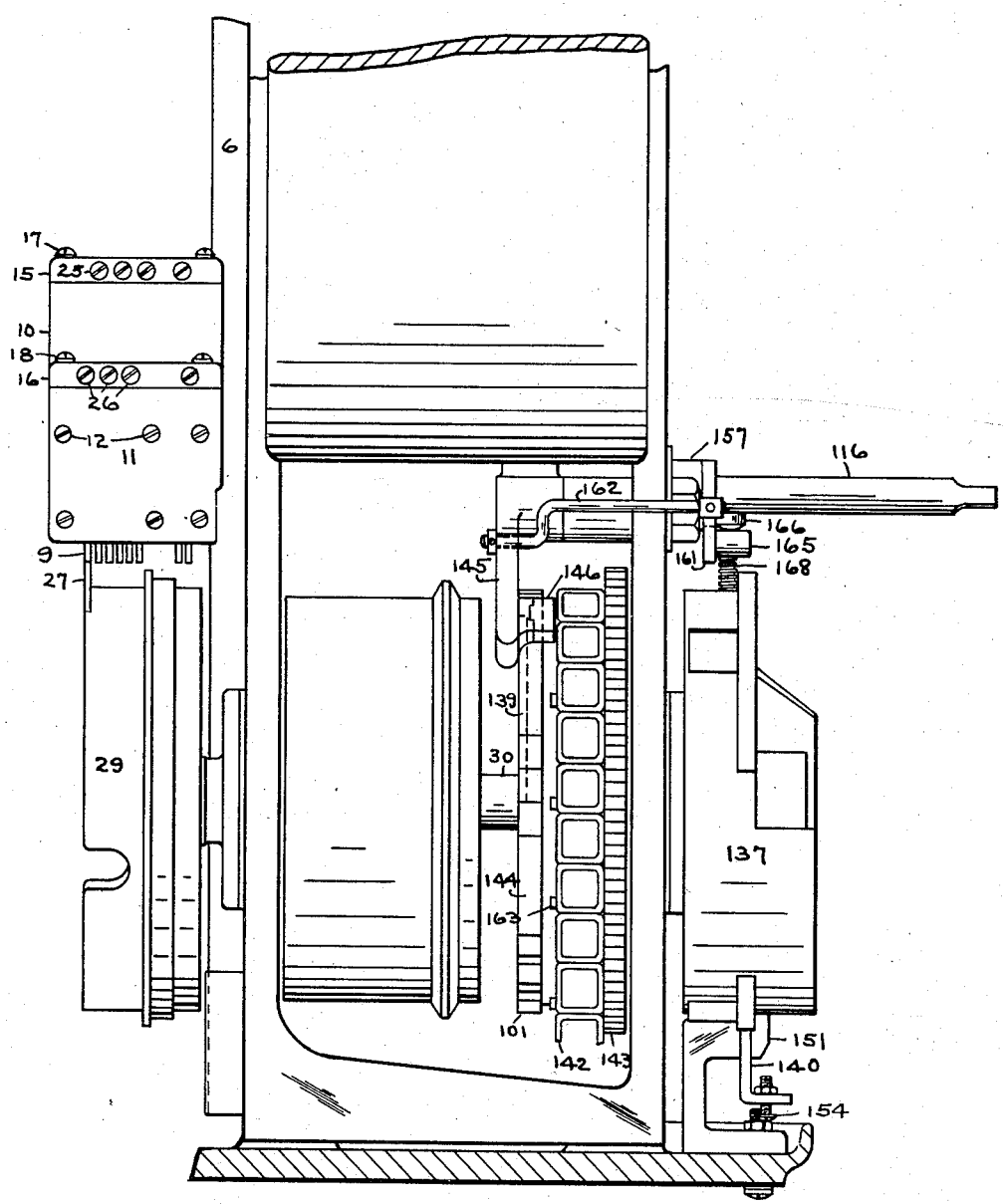

INVENTORS:
ROBERT H. LAWSON,
BY ARTHUR N. CLOUTIER,
Roy F. Lovell
ATTORNEY.

Patented Nov. 1, 1938

2,135,185

UNITED STATES PATENT OFFICE 2,135,185

PATTERN MECHANISM FOR KNITTING

Robert H. Lawson, Pawtucket, and Arthur N. Cloutier, Lonsdale, R. I., assignors to Hemphill Company, Central Falls, R. I., a corporation of Massachusetts Application November 17, 1930, Serial No. 496,228

12 Claims. (Cl. 66—54)

This invention relates to an improved mechanism for fashioning the leg of the stocking and for variably controlling the lengths of stitches in the various parts of the stocking. As herein specifically disclosed the machine is of a type similar to that disclosed in the patent to Hemphill 933,443, September 7, 1909, although the invention is applicable to stationary needle cylinder machines and is not in all respects limited to circular machines nor to hosiery machines.

In the drawings:

Fig. 2 is a view partly in section showing the means for advancing the pattern chain;

Fig. 3 is a view partly in section of a fashioning bracket for variably determining the lengths of stitches to be knit in different parts of the stocking;

Fig. 4 is a view in end elevation of the fashioning bracket shown in Fig. 3;

Fig. 5 is a detail view of the cam block;

Fig. 6 is a view showing the cams for controlling means in the fashioning bracket to determine the lengths of stitches;

Fig. 7 is a detail view in section of the fashioning bracket and drum upon which the cams, Fig. 6, are mounted;

Fig. 8 is a view in end elevation showing an eccentric fashioning cam which determines the lengths of the stitches during the fashioning of the leg of a stocking;

Fig. 9 is a detail view showing the position of the eccentric at the beginning of the fashioning of a leg of a stocking;

Fig. 10 is a view similar to Fig. 9 but with the eccentric in the position it assumes at the completion of the fashioning of a leg of a stocking;

Fig. 14 is a view similar to Fig. 12 but showing a modification;

Fig. 17 is a fragmentary view showing a modified form of plunger mounted in a fashioning bracket;

Fig. 18 is a detail view of the plunger shown in Figure 17; and

Fig. 19 is a view similar to Fig. 6 but showing 5 cams arranged on the drum adapted to control the aligned plungers shown in Figs. 17 and 18.

Figure 1:
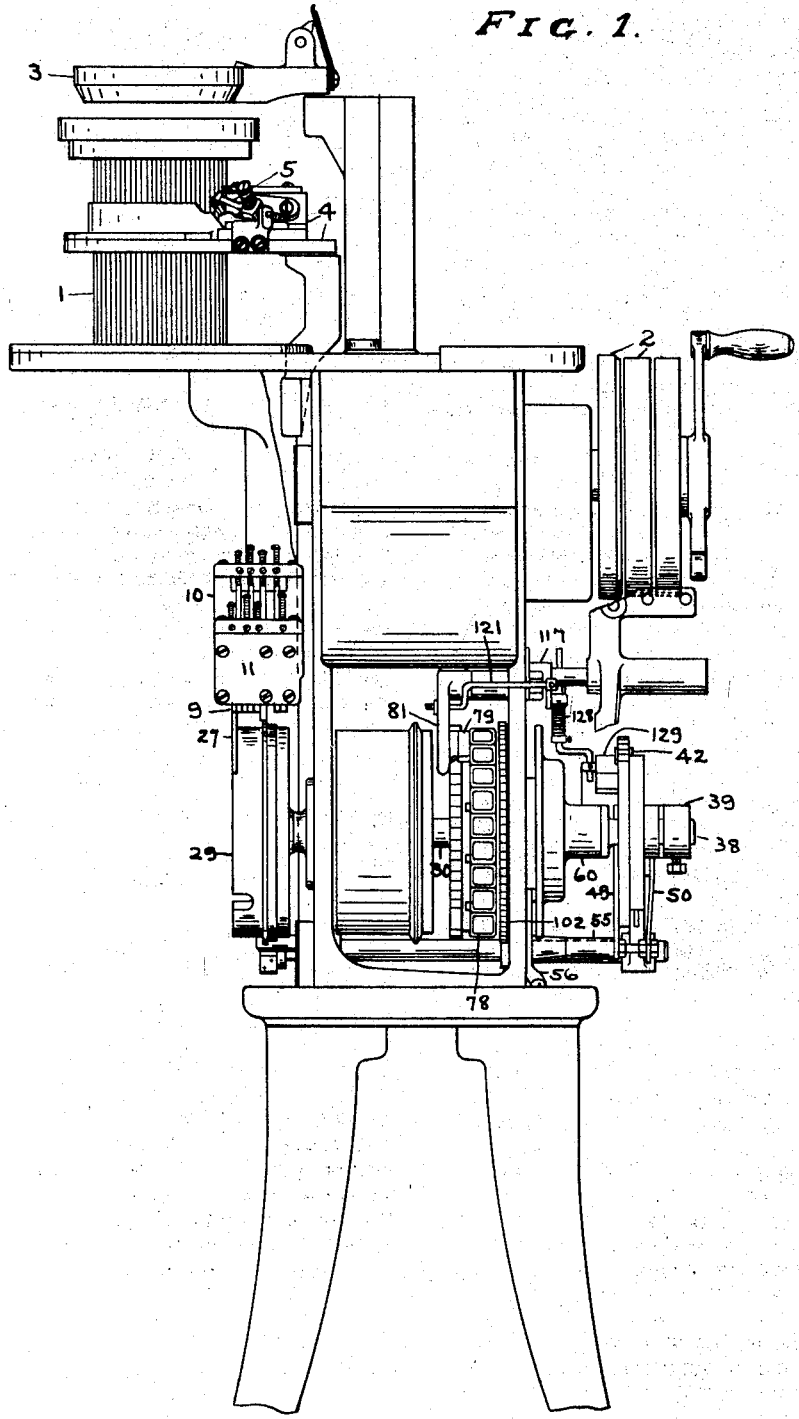
Fig. 1 is a view in front elevation of a knitting machine with the improvements applied.
Figure 12:
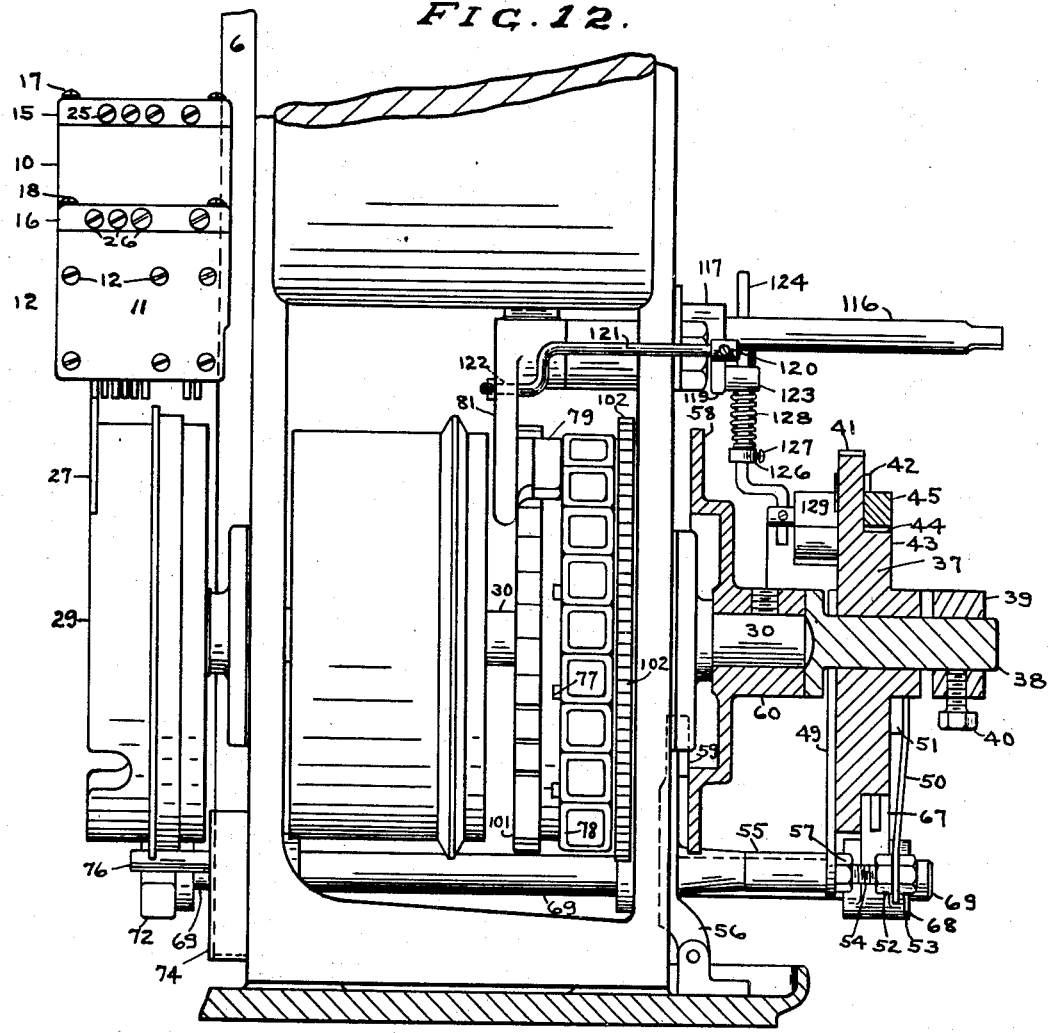
Fig. 12 is a view partly in section through the machine showing the eccentric cam and shaft controlled thereby.
Figure 11:
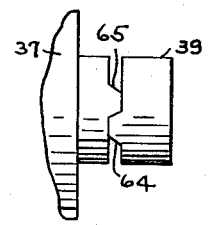
Fig. 11 is a detail view of means for retiming the fashioning wheel shown in Figs. 8–10.

The knitting machine herein disclosed has mounted therein the usual needle cylinder 1 which, preferably, rotates continuously in one direction during the knitting of the legs and feet of stockings and reciprocates during the knitting of the heel and toe pockets. Circular and reciprocating movements of the needle cylinder 1 are communicated thereto by means of a ring gear 15 (not shown) connected to the needle cylinder and driven through other gearing which in turn is driven by the usual pulleys 2. The usual latch ring 3 is provided as well as the usual cam block or cam ring 4 upon which are mounted narrowing picks 5 and widening picks (not shown). The usual sinker head and cap control the movements of the sinkers.

Referring specifically to Figs. 3–7 inclusive, means are shown for varying the lengths of stitches drawn by the needles and/or sinkers consisting of mechanism which varies the vertical positions of the cam block 4 and is primarily intended variably to determine the lengths of stitches knit in different parts of a stocking as for example, in the leg, high splice, heel, double sole, toe and looper's rounds although equally well adapted to vary the lengths of the stitches for any other purpose.

The means specifically herein disclosed for variably determining the vertical positions of the cam block 4, include a rod 6 connected to the cam block 4 and supporting the same. Attached to the rod 6 intermediate its ends by means of a screw or bolt 7 is a fashioning bracket 8 provided with a series of pins or plungers. 9 adjustably carried thereby and received in slots or grooves in the said bracket. The bracket 8 is a two-part bracket consisting of a part 10 integral with or connected to the portion of the bracket attached to the rod 6, and another part 11 which is detachably connected to the part 10 as by screws 12. The pins or plungers 9 within the slots provided in the part 10 of the bracket are retained therein by the part 11 of the two-part bracket while the pins or plungers 9 in the part 11 are retained in the slots therein by the part 10 of the bracket. In other words the bracket parts 10 and 11 each serve to retain the pins or plungers 9 within the slots of the other or companion bracket part. As aforesaid the pins or plungers 9 are adapted adjustably to be positioned lengthwise of the slots in the bracket 10 and 11 and for this purpose adjusting screws 13 and 14 are provided which pass through threaded holes in plates 15 and 16, respectively connected to the upper ends of the parts 10 and 11 of bracket 8 as by screws 17 and 18. The respective screws 13 and 14 may be adjusted by turning them in one direction or the other by which turning movements the set screws either cause the pins or plungers 9 to move downwardly or permit springs 19, 20 to engage upper shoulders provided by the recesses 21, 22 in the respective plungers and cause the said plungers or pins to retract or move upwardly. The coil springs 19, 20, at their lower ends respectively engage pins or rods 23, 24 seated within slots provided in the respective bracket parts 10 and 11. After the set screws 13 and 14 have been adjusted to the desired extent locking screws 25, 26 are turned in order to retain the screws 13, 14 in their set positions.

The pins or plungers 9 at their lower ends project beyond the respective bracket parts 10 and 11 and, during fashioning of the leg of a stocking, rest upon an adjustable cam 27 pivotally mounted at 28 upon a cam drum 29 which is mounted for turning movements upon a cam shaft 30. The pivotally mounted cam 27 at its other end is provided with an elongated slot 31 through which passes a screw 32 in threaded engagement with the drum 29. The elongated slot 31 and pin or screw 32 permit the cam 27 to be tilted or moved upon its pivot 28, and for this purpose an adjusting screw 33, received through a threaded opening in a lug 34 carried by the drum 29, engages at its other end at 35 a face of the cam 27, whereby adjustments of the screw 33 cause the said cam 27 to move in directions toward or from the surface of the drum 29 and consequently vary the eccentricity of the surface of the cam 27 with respect to the axis of the drum 29.

As will be understood from an inspection of Figs. 3, 4 and 5, adjustments of the pins or plungers 9 in the direction of the drum 29 cause the cam block 4 to be raised which movement of the cam block results in shorter stitches being drawn by the needles and sinkers.

In the construction shown in Figs. 3, 4, 5 and 6 fashioning of the leg of a stocking is determined by the cam 27 and changes in the lengths of the stitches as for the high splice, heel, double sole, toe and looper's rounds, are determined by cams 36 carried by the drum 29, which cams are omitted from Figs. 1, 3 and 4 but are shown in Fig. 6.

In view of the fact that the fashioning of the leg takes up a considerable portion of the periphery of the drum, there is not always sufficient room on the remaining portion of the periphery of the drum for the desired number of cams 36 necessary to determine all the different lengths of stitches required. Accordingly, fashioning means independent of the drum 29 may be provided as specifically disclosed in Figs. 8-13 inclusive wherein is shown in addition to the fashioning drum 29, and at the other side of the frame therefrom, auxiliary means for fashioning the leg of the stocking consisting of a fashioning wheel or disc 37 freely mounted upon a shaft 38 which is fast to and is a continuation of shaft 30. The disc 37 is retained against movements endwise of shaft 38 by means of a collar 39 held in place upon said shaft 38 by a set screw 40. The wheel or disc 37 is provided with teeth 41 along a portion of its periphery, which teeth are periodically engaged by means of a pawl 42. The wheel 37 has fastened thereto integrally or otherwise a hub 43 the major portion of the periphery of which is concentric with the axis of the wheel 37 but which is cut along a portion of its periphery as at 44 and within which cut out portion is adjustably seated a ring segment or eccentric 45. The eccentric 45 is pivoted at 46 to the wheel 37 and adjacent to its other end receives therethrough an adjusting screw 47 in contact with the cut out portion of the hub 43 so that by adjusting the set screw 47 the eccentric 45 may be moved to or from the hub 43. A locking screw 48 serves to hold the screw 47 in a desired adjusted position.

A brake 49 bears against one face of the wheel 37 while a leaf spring 50 having a shoe or pad 51 is in constant braking engagement with the opposite face of the wheel 37. The brake 50 is maintained in adjustable frictional engagement with one face of the wheel or disc 37 by means of two loose nuts 52, 53 which are in threaded engagement with a threaded stud 54 fastened to a hub 55 carried by a brake 56. To effect such adjustments the brake 50 is received between the two nuts 52, 53 which two nuts are turned either to increase or decrease the braking pressure which the pad 51 exerts on the face of the pattern wheel or disc 37. The brake 49 is clamped between hub 55 and a nut 57 which is also in threaded engagement with the threaded stud 54. When the pawl 42 engages a tooth 41 and causes racking movements to be imparted to the fashioning wheel or disc 37 the brakes 49, 50 prevent overthrow of the said pattern wheel or disc.

The usual disc or wheel 58 for shipping the belt from one pulley 2 to another is fixed to and turns with cam drum shaft 30. The brake 56 which carries brakes 49 and 50 is provided with a friction pad or other means 59 normally held in contact with a face of the disc or wheel 58 in any suitable manner so as to prevent overthrow of the wheel 58 and cam shaft 30. To the hub 60 of the wheel 58 is attached in any suitable manner the stub shaft 38 which when connected with the hub 60 turns with the cam shaft 30.

Movements are imparted to the pawl 42 by mounting the same upon the constantly oscillating quadrant shaft 61 and as a consequence thereof the pawl 42 may rack the fashioning wheel or disc 37 once for each twelve courses while active during the knitting of the calf or fashioned part of the leg of a stocking. The number of courses comprised within the fashioned part of a stocking is determined by the number of teeth 41 between the points indicated by the numerals 62 and 63.

After the fashioning for the leg of one stocking has been completed and until the fashioning portion of the leg of the next stocking is begun the fashioning wheel or disc 37 although loosely mounted on the shaft 38 is carried around with the said shaft and drums, including drum 29, by means of a lug 64 on the collar 39 engaging with a lug 65 carried by and forming part of the disc or wheel 37. During the knitting of the fashioned portion of the leg of the stocking the main fashioning drum 29 as well as the shaft 38 do not move; but the pawl 42, which at the commencement of leg fashioning is in position to engage the first tooth 41 as shown in Fig. 9, thereafter and throughout the fashioning of the leg intermittently racks the auxiliary fashioning wheel or disc 37 and advances the same in the direction of the arrow, Fig. 9, until the last tooth has been engaged by the pawl 42 at which time the fashioning wheel 37 is in the position shown in Fig. 10. The independent movement of the wheel 37 from the position of Fig. 9 to that of Fig. 10 carries or moves the lug 65 to the position shown in Fig. 10 where it is substantially separated from the companion lug 64. Thereafter the auxiliary fashioning wheel 37 ceases to move but the main shaft 30 and main fashioning drum 29 are again set in motion. The lug 64 thereupon moves in the direction of the arrow independently of the wheel 37 and until the said lug 64 engages the companion lug 65 after which the pattern wheel 37 moves with the shaft 38 and main fashioning drum 29 until the pawl 42 is again in position to engage the first tooth 41.

The hereinbefore described independent movement of the lug 64, from the position shown in Fig. 10 until it engages the companion lug 65 after which the two lugs move around to the position shown in Fig. 9 where the pawl 42 again engages the ratchet teeth 41 to control the movements of the auxiliary fashioning wheel or disc 37 and thereby determine the lengths of the stitches drawn by the cooperative movements of the sinkers and needles, acts to retime the mechanism so that there is no necessity of manually setting or retiming the fashioning wheel or disc 37.

The ring segment or eccentric 45 is engaged by a shoe 66 pivotally carried by one arm 67 of a lever 68 fixed to a shaft 69. Intermediate the ends of the arm 67 the shoe 66 is pivoted as at 70 and a screw 71 passing through the arm 67 and in threaded engagement therewith bears upon the shoe 66 and serves adjustably to position the latter with respect to the surface of the eccentric 45.

The shaft 69 extends through and transversely of the machine frame to the other side thereof (Figs. 12, 13) and to the other end of the said shaft 69 is fastened the other arm 72 of the lever 68 as by means of set screws 73. The rod or arm 6 projects below the bracket 8 and into a housing or bracket 74 fastened to and forming part of the machine frame. The housing is provided with an elongated slot 75 through which passes a pin 76 made fast to the rod 6 at its other end. The end of the pin 76 projecting through the slot 75 rests upon the lever arm 72 and consequently upward movements of the said lever arm are transmitted to the rod 6 and to the cam block 4.

As shown in Fig. 8 the portion of the surface of the eccentric 45 corresponding to the last stitch of the leg fashioning is raised above the portion of the eccentric corresponding to the first stitch thereof and consequently as the fashioning disc or wheel 37 moves from the position shown in Fig. 9 to that shown in Fig. 10 the cam block 4 is gradually raised and the stitch progressively shortened in order properly to fashion or shape the leg of the stocking.

As hereinbefore stated the pawl 42, during the fashioning of the leg of the stocking, periodically engages teeth 41. The periodic racking movements imparted to the pattern wheel 37 by pawl 42 are determined by the means specifically disclosed in Figs. 2, 8, 9, 10 and 12 wherein lugs 77 on the pattern chain 78 are movable into engagement with a companion lug 79 which is connected, by means of a screw 80, to a pawl idling lever 81. The lever 81 is pivotally supported upon a stub shaft 82 provided with a head 83 and in threaded engagement with a boss or enlargement 84 of the machine frame.

When lug 79 is not engaged by a chain lug 77 the lever 81 is in such a position that a rearwardly extending arm 85 of the said lever is maintained in a raised position by means of a spring 86, which is mounted upon a block 87, carried by the frame of the machine, engaging a lug 88 integral with the hub 89 of the lever 81. When in raised position the arm 85 of the lever 81 maintains a pawl 90 in an elevated and idle position. The said pawl 90 is pivotally mounted at 91 upon the quadrant 92 which latter is pivoted to the quadrant shaft 61 as at 93 and has an arm 94 the outer or free end of which is pivoted at 95 to a link 96. The link 96 at its other end is pivotally and adjustably connected by a pin and slot 97 to the "104" gear 98. The pivotal connection between the link 96 and "104" gear 98 is an eccentric one whereby when, during continuous circular knitting, the gear 98 is rotated by means of a pinion 99 loosely mounted upon a shaft 100, the pivoted end of the link 96 is rotated about the axis of the gear 98 and consequently the quadrant 92 is oscillated once for each revolution of the "104" gear 98 or every four courses of knitting.

Oscillation of the quadrant 92 causes the pawl 90 to be reciprocated back and forth once for each four courses of knitting and when the arm 85 of the pawl idling lever 81 is in raised position such pawl 90 reciprocates idly along the upper face or edge of the said arm 85. At other times, i. e., when the arm 85 is not in a raised position pawl 90 is permitted to drop into engagement with teeth of the ratchet 101 and thereby rack or advance the said ratchet 101 as well as shaft 30 and cams carried thereby.

The active and inactive movements of the pawl 90 are dictated by means of the lugs 77 carried by the pattern chain 78 which pattern chain is mounted upon the sprocket carried by a ratchet wheel 102 which ratchet wheel, sprocket and chain 78 are loosely mounted upon the shaft 30. The lugs 77 may be and preferably are of three heights (one height only being shown) and when a low lug 77 engages lug 79 the lever arm 85 is lowered a slight extent which permits the pawl 90 to advance the ratchet 101 the distance measured between two adjacent ratchet teeth such as 103, Fig. 2; when a lug 77 of an intermediate height engages the lug 79 the arm 85 of the lever 81 is lowered to such an extent as to permit the pawl 90 to advance the ratchet 101 the distance of two ratchet teeth as indicated at 104, Fig. 2; when a high lug 77 engages the lug 79 the lever arm 85 permits the pawl 90 to fully advance the ratchet 101 the distance measured by four ratchet teeth and indicated at 105, Fig. 2. Thus by an appropriate disposition of the lugs 77 upon the pattern chain 78 the ratchet 101 and consequently the shaft 30 and cams carried thereby may be advanced as desired or prevented from advancing throughout the knitting of any desired number of courses.

The loosely mounted ratchet 102 and chain 78 are advanced throughout the knitting of a stocking or other fabric, once for each four courses of knitting, by means of a shoe or cam 106 fast to the shaft 93 and therefore movable with the quadrant 92. The shoe or cam 106 engages a roll mounted upon a pin or screw 107 carried by one arm of a lever 108 which is pivoted intermediate its ends to any convenient part of the machine frame as at 109 and has pivotally mounted upon its other arm 110 as at 111 another pawl 112 which last named pawl is in constant engagement with the equally spaced ratchet teeth 113 on the periphery of the ratchet 102.

The needle cylinder 1 is, preferably, driven in a continuous circular direction throughout the knitting of the circular portions of the legs and feet of the stockings and in a reciprocating manner during the knitting of the heels and toes and for this purpose there is provided the usual form of drive including the pinions 99, 114. The pinion 99 is provided with a sleeve 115 and is loosely mounted upon shaft 100. During circular knitting the rotary movements imparted to the said sleeve 115 and pinion 99 by means of a driving pulley 2 are communicated to the shaft 100 by means of a sliding clutch (not shown) which clutch is splined to the said shaft 100 and is shiftable to and from engagement with the pinions 99 and 114. As aforesaid the clutch when in engagement with the pinion 99 connects the same with the shaft 100 whereby the latter receives continuous circular movements and by means of gearing (not shown) the needle cylinder revolves continuously in one direction. However, when commencing the knitting of heels and toes the aforesaid clutch is shifted lengthwise of the shaft 100 and into locking engagement with the pinion 114 whereupon the pinion 99 drives the "104" gear 98 which in turn oscillates the quadrant 92. The oscillating movements of the quadrant 92 are in turn communicated to the pinion 114 which latter, keyed to the shaft 100 by means of the aforesaid clutch, causes the said shaft 100 to be driven first in one direction and then in another and for nearly a complete revolution in each direction.

Operatively connecting the ratchet wheel 37 and the chain 78 whereby, whenever during the fashioning of the leg of the stocking a lug 77 engages the lug 79 of the pawl 81, the ratchet wheel 37 is advanced by the pawl 42, are means including (Figs. 8, 12 and 14) the belt shipper supporting shaft 116 upon which is mounted for pivotal movements a lever 117 having two arms 118 and 119. The arm 118 has attached thereto adjacent to its free end by means of a set screw 120 one end of a bent rod 121 the other end of which is fastened to the lever 81 at 122. Through a pin or bushing 123, pivotally mounted upon the free end of the arm 119 of the lever 117, slidably passes a rod 124 provided with collars 125 and 126 adjustably fastened thereto by set screws 127. The collar 125 surrounds the rod 124 above the free end of the lever arm 119 while the collar 126 surrounds the shaft 124 adjacent to the lower end thereof. Surrounding the shaft 124 between the collar 126 and lever arm 119 is a coil expansion spring 128 which serves to retain the arm 119 in engagement with the collar 125. At its lower end the rod 124 is pivotally connected to a lever 129 at 130. The lever 129 to which is fastened the pawl 42 is pivoted at 131 to one arm of a lever 132 which lever is pivotally mounted intermediate its ends upon the quadrant shaft 61. The other arm of the lever 132 has attached thereto a spring 133 the other end of which is connected to stud 54. The arm of the lever 132 to which is attached the spring 133, has connected at its free end an adjustable stop screw 134 normally urged in contact with the hub of the lever 68 by the spring 133.

At the commencement of leg fashioning a lug 77 carried by a chain 78 engages lug 79 and elevates pawl lever 81 to the position shown in Fig. 8 and throughout the leg fashioning whenever a lug 77 engages the lug 79 that end of the lever 81 is elevated which rocks the lever 117 and causes the pawl 42 to be moved to a position to engage a tooth 41 and rack the auxiliary ratchet 37. After the desired number of non-fashioned courses have been knitted another lug 77, through the connections hereinbefore described, again causes the pawl 42 to engage a tooth 41 and advance ratchet 37. The number of lugs 77 and the number of plain links separating them determine the fashioning of the leg, i. e., the number of fashionings and the number of courses between fashionings. The construction hereinbefore described controls the pawl 42 so that the latter racks the auxiliary fashioning wheel 37 once every twelve courses although the number of courses may be varied if desired. The last fashioning lug 77 causes the pawl 42 to engage the last tooth 63 (Fig. 10) and consequently rack wheel 37. Before the pawl 42 is again racked by the oscillations of the quadrant shaft 61 the pawl engaging the ratchet 102 has advanced said ratchet and chain 78 to such a position as to move the lug 77 from under the companion lug 79 with the result that the pawl 42 is elevated to an idle position above the teeth 41.

While the pawl lever 81 is partially elevated as described, the pawl 90 (Fig. 2) reciprocates idly along a portion 135 of the periphery of the ratchet wheel 101 not provided with teeth. The partial lowering of the pawl 90 by the engagement of the lug 79 with a lug 77 although it permits the said pawl 90 to take a short stroke does not permit it to engage the next following tooth on the ratchet wheel 101, i. e., the tooth beyond a portion 135, of the periphery of the ratchet wheel 101 and rack the cam shaft 30 and cams carried thereby.

The spring 128 primarily functions to compensate for inequalities in the heights of the pattern chain lugs 77 in that, should a certain lug 77 be somewhat longer or higher than companion lugs, the pawl 42 does not jam but the extra movement of the lever arm 119 is taken up by the coil spring 128. The coil spring also functions to maintain the lever arm 119 in constant engagement with the collar 125.

A recess 136 provided in the periphery of the fashioning wheel 37 prevents the constantly reciprocating pawl 42 from cutting into the surface of the said wheel 37.

Figure 16:
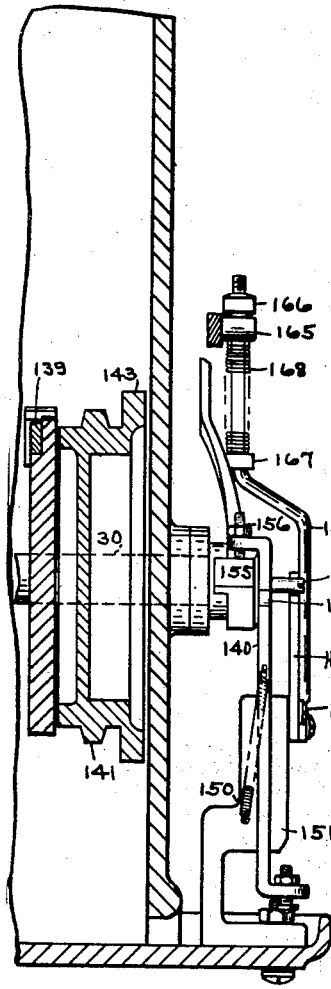
Fig. 16 is a view partly in section on line 16—16, Fig. 15, but omitting the fashioning wheel.
Figure 15:
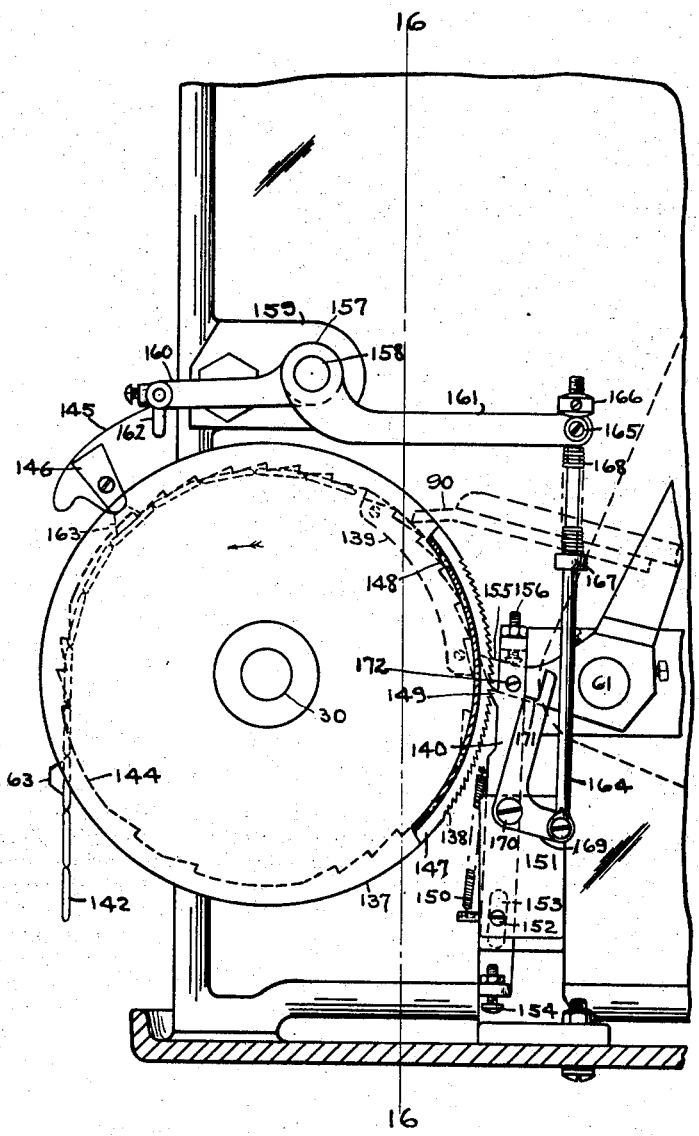
Fig. 15 is a view similar to Fig. 8 but of the modification shown in Fig. 14.

In Figs. 14, 15 and 16 there is shown a modified form and control of the fashioning means which is part of the usual stop motion drum 137. Whereas in the construction hereinbefore described and shown in Figs. 8-12 inclusive, the auxiliary fashioning wheel 37 is independent of the fashioning drum 29, the fashioning means, Figs. 14, 15, 16 does not provide for independent fashioning of the leg of a stocking; but a portion of the periphery of the drum 137 is provided with ratchet teeth 138 by means of which fashioning of the leg is determined while the remaining portion of the periphery of the drum 137 as well as of the drum 29 may be used for such other variations in the lengths of the stitches as are required or for other purposes.

During fashioning of the leg of a stocking the fashioning means determines the length of stitch and for that purpose is made fast to the shaft 30 which at its other end carries the main fashioning drum 29. Also fixedly mounted upon the shaft 30 is the usual ratchet wheel 101 which ratchet wheel is periodically advanced by means of the pawl 90, Fig. 2. To prevent the pawl 90 from engaging teeth of the ratchet wheel 101 and advancing the cam shaft 30 during the fashioning of the leg of a stocking one face of the ratchet wheel 101 is recessed. Seated within the recess is a pawl idler 139 which maintains the pawl 90 above the level of the ratchet teeth of the ratchet wheel 101 and therefore prevents the said pawl 90 from advancing the ratchet wheel 101 throughout the fashioning of the leg, during which fashioning a pawl 140 periodically engages the teeth 138 and advances the auxiliary drum 137 every twelve courses more or less.

Loosely mounted upon the shaft 30 adjacent to the ratchet wheel 101 is a sprocket 141 upon which is mounted a chain 142. Integrally or otherwise connected to the sprocket 141 to advance the chain 142 is a ratchet wheel 143 which is periodically advanced in the same manner as is the ratchet wheel 102, Fig. 12.

When knitting portions of a stocking other than the fashioned leg the pawl 90, by engaging teeth of the ratchet wheel 101, controls the movements of the cam shaft 30 and cam drums mounted thereon although at times the pawl 90 idly reciprocates along the surface of the ratchet wheel 101 as at 144 and remains in such position until the ratchet 143 advances the chain to a position where a high lug thereon elevates a lever 145 by engaging a lug 146 carried thereby; whereupon the lever 145 permits the pawl 90, by means of connections shown, Fig. 2, to drop into engagement with the next tooth at the beginning of its return stroke and thus again advance the ratchet wheel 101 and cam shaft 30.

During the fashioning of the leg the auxiliary fashioning ratchet teeth 138, as before stated, determine the changes in the lengths of stitches and for that purpose the said teeth 138 are provided upon the periphery of an arc-shaped strip 147 which is detachably fastened to one face of the drum 137 by means of screws 148. The pawl 140, which is adapted periodically to engage the ratchet teeth 138 and advance the drum 137, consists of a bar or rod adjacent to the upper end of which is a tooth 149 which, from time to time, engages the teeth 138 and advances the ratchet wheel 137. Attached to the pawl 140 intermediate its ends is a coil spring 150 which is attached at its other end to a bracket 151 upstanding from the machine frame. A pin or screw 152 passes through the bracket 151 and acts slidably to receive and guide the pawl 140 by passing through an elongated slot 153 provided therein. The lower end of pawl 140 is turned at a right angle and passing through said turned end is an adjustable stop screw 154 adapted under the influence of the spring 150 to engage bracket 151. The pawl 140 is periodically actuated by means mounted upon the quadrant shaft 61 and consisting of a heel and toe dog 155 pivoted upon shaft 61 one end of which dog is positioned beneath an adjustable screw 156 carried by the upper end of the pawl 140.

In order to rack the drum 137 when desired, preferably every twelve courses, and to discontinue the racking when desired, means are provided which includes a lever 157 pivoted upon a shaft 158 carried by a boss or enlargement 159 constituting part of a machine frame. The lever 157 consists of two arms 160 and 161. The arm 160 has connected thereto adjacent to its free end an angle-shaped bar 162 which is also connected at its other end to lever 145 the lug 146 of which is adapted to be engaged by any one of the series of lugs 163 carried by the pattern chain 142. The arm 161 of the lever 157 at its free end is slidably and pivotally connected to a rod 164 by means of a bushing 165 loosely mounted upon the end of the lever arm 161 and through which bushing the said rod 164 passes. The rod 164 is provided with two adjustably mounted collars 166 and 167 and a coil spring 168 which surrounds the rod 164 between the collar 167 and the end of the lever arm 161, normally maintains the free end of the arm 161 in engagement with the collar 166. The rod 164 at its lower end is pivoted to a bell crank lever 169 which is pivoted at 170 to the bracket 151 and has the free end of its other arm notched as at 171 for the purpose of periodically engaging under a pin 172 projecting laterally from the pawl 140 adjacent to its upper end and so that the pawl 140 may be maintained in an upper position against the tension of the spring 150. The bell crank lever 169 holds the pawl 140 in an elevated position and prevents retraction of the same by the spring 150 so that the tooth 149 fails to engage the next ratchet tooth 138 and the drum 137 is not advanced until the bell crank lever 169 is released from engagement with the pin 172 by means now to be described.

Whenever during the fashioning of the leg of the stocking it is desired to continue the same length of stitch over a certain number of courses, usually twelve or a multiple thereof, the pattern chain 142, when advanced, moves a lug 163 from under the lug 146 whereupon a spring identical with spring 86, (Fig. 2), depresses the outer arm of lever 145 and consequently raises the lever arm 161 which in turn raises the rod 164 and moves the bell crank lever 169 from the position of Fig. 15 to such a position that the shoulder provided by the notch 171 engages under the pin 172, causes tooth 149 to rack or advance drum 137 and holds the pawl 140 in an idle, elevated position. If, after a desired number of courses, preferably twelve or a multiple thereof, it be desired again to advance the ratchet wheel 137, the next link on the pattern chain 142 is provided with a lug 163 which moves under the lug 146 and raises the outer arm of lever 145 thereby lowering the lever arm 161 as a result of which the spring 168 moves the bell crank lever 169 to the position of Fig. 15 and releases the pawl 140 to permit the drum 137 to be racked the next time the dog 155 raises the pawl 140.

Figure 13:
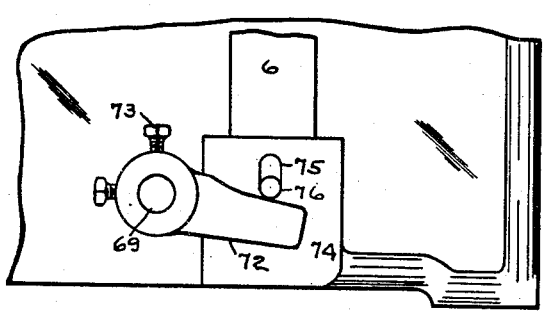
Fig. 13 is a detail view at the side of the machine opposite the eccentric cam and showing the shaft controlled by the eccentric cam in turn controlling the movements of a rod connected to the cam block.

The ratchet wheel or drum 137, Figs. 14, 15 and 16, is fast to the cam shaft 30 and as the said drum 137 is turned, in the manner hereinbefore described, the cam shaft 30 and the fashioning drum 29 are turned and the leg fashioning is determined by the cam 27 which engages the plungers 9 and thereby raises the cam block 4 or permits the same to drop; whereas the movements of the independent fashioning wheel 37, Figs. 8–12, are transmitted through lever 37 and its arm 72, Fig. 13, to control the vertical movements of the cam block 4.

In Figs. 17, 18 and 19 there is shown a modification of the fashioning bracket and cams carried by the cam drum 29 for determining and varying the lengths of the stitches. The cams used are short, reversible and interchangeable cams 173 in cooperative relation with which are straight plungers 174 and other plungers 175. The depending ends of the straight plungers 174 and the offset toes 176 of the plungers 175 are adapted to be engaged by the mentioned cams 173. The offsetting of the toes 176 with relation to the shanks of the plungers 175 aligns the toes 176 with the cam engaging ends of the plungers 174 whereby no overlapping of the cams 173, such as disclosed in Fig. 6, is necessary. The plungers 174, 175 are notched as are the corresponding plungers shown in Figs. 3, 4 and 5 thereby to receive springs within the said notches which springs tend to retain the plungers in extreme, elevated positions.

The interchangeability of the cams 173 is due to the fact that the said cams are of a length equal to the distance between two adjacent ratchet teeth 103, Fig. 2, and as the distances between adjacent ratchet teeth of the ratchet 101 are either the distances between adjacent ratchet teeth 103 or a multiple thereof (the distance between adjacent ratchet teeth 104 being twice the distance between adjacent ratchet teeth 103 and the distance between ratchet teeth 105 being four times that of the distance between ratchet teeth 103) one or more such cams 173 will span a distance on the drum 29 equal to or equivalent to the distances between adjacent teeth on the ratchet 101. Although the cams are hereinbefore referred to as being of a length equal to the distance between adjacent ratchet teeth 103 or a multiple thereof, should the diameter of the ratchet 101 and the drum 29 be unequal then the cams 173 would measure an angle equal to that measured by the distance between adjacent ratchet teeth 103, but the length of a cam would not be equal to the distance between adjacent teeth 103.

As hereinbefore stated the cams 173 are reversible as well as interchangeable, i. e., some of the cams such as the cams indicated by the reference characters 173a, 173b are not only interchangeable, one for another but may be reversed and fastened to the drum 29 either in one of the places indicated by said reference characters 173a, 173b or may be fastened to the drum 29 at other places indicated by said reference characters 173a, 173b, where the cams are displaced 180 degrees with respect to the cams 173a, 173b first named. Furthermore although for the particular character of fabric intended to be knitted with the cams arranged as indicated in Fig. 19, cams 173a, 173b alone are shown as reversible, nevertheless when arranging cams 173 on the surface of a drum and for the purpose of controlling the needles to knit other forms of hosiery or other fabric, certain of the said cams 173 other or in addition to cams 173a, 173b may be reversible and interchangeable.

Although the two forms of the invention hereinbefore described differ somewhat nevertheless they have in common the idea of providing a cam shaft movable one complete revolution or 360 degrees while knitting a stocking, in combination with means supplemental to the pattern chain 78 and ratchet adjacent thereto which means includes fine ratchet teeth whereby it is possible to advance the drum 29 or wheel 37 a few degrees only for each fashioning or change in the lengths of the stitches; whereas the fashioning means heretofore used was indirectly controlled by a pattern chain similar to the chain 78 and directly by a coarse toothed ratchet similar to or identical with the ratchet 101, Fig. 2, as a consequence of which whenever the quadrant actuated pawl advanced the ratchet thereby advancing a fashioning drum similar to the drum 29, the ratchet was advanced the distance measured between two adjacent ratchet teeth which was about four times the distance between two adjacent teeth 41 (Fig. 8) or 138 (Fig. 15) and as a consequence the adjacent ratchet teeth were separated a greater number of degrees than the number of degrees measured by the distances between adjacent teeth 41 and 138.

Due to the relatively small angular displacement of the auxiliary fashioning means hereinbefore described it is possible to fashion the leg of a stocking much more gradually and uniformly than heretofore and furthermore, at the same time, the peripheral surfaces of the drum 29 and/or other drums mounted upon the shaft 30, when the dependent fashioning means first described is employed, may be utilized for other fashionings or for other purposes.

We claim:

1. A knitting machine including a needle bed and needles mounted therein to move independently to and from thread taking position, means variably to control the needles, a cam shaft having two rotary means mounted thereon each adapted by such rotation variably to act upon the means first mentioned, other means adapted either to engage one of such two rotary means and advance the same, at times, circumferentially through an angle or angles of a predetermined number or numbers of degrees; or to advance the other such means circumferentially through an angle or angles of fewer degrees than the number of numbers of degrees first mentioned while fashioning the leg of a stocking.

2. A knitting machine of the independent needle type in combination with cam means for determining the character of knitting which cam means may be moved through 360 degrees before the pattern controlled changes are repeated, auxiliary cam means adapted independently to vary the character of knitting, controlling means whereby the cam means first mentioned are intermittently advanced while active to control the character of knitting during the knitting of some of the courses but are inactive during the knitting of other courses, and which controlling means are also adapted to initiate movements of the second mentioned cam means and continue such movements intermittently throughout the knitting of the courses second mentioned during the knitting of which courses the said auxiliary cam means are active to control the character of knitting.

3. A knitting machine including a rotary cam shaft adapted by its movements to control the character of knitting, a chain carried by the cam shaft but mounted for independent movements thereon, means for intermittently and constantly advancing the chain, a ratchet rigidly carried by the cam shaft and a pawl adapted intermittently to advance the said ratchet and cam shaft when released by means on the chain, other means normally maintaining the pawl in an inoperative relation with respect to the ratchet, pawl releasing means controlled from the chain whereby the pawl is permitted to engage and advance the ratchet, other ratchet means and a pawl for advancing such ratchet, means controlled from the pattern chain whereby the pawl second mentioned advances its ratchet means while the pawl first mentioned is idle.

4. A knitting machine of the independent needle type in combination with cam means for determining the character of knitting, which cam means may be moved through 360 degrees before the pattern controlled changes are repeated, auxiliary cam means adapted independently to vary the character of knitting, controlling means whereby the cam means first mentioned are intermittently advanced and active to control the character of knitting during the knitting of some of the courses, but are inactive and prevented from advancing throughout the knitting of other courses, which controlling means are also adapted to initiate movements of the auxiliary cam means and continue such movements intermittently throughout the knitting of the courses second mentioned during the knitting of which courses the said auxiliary cam means are active to control the character of knitting.

5. A knitting machine, a rotatable cam shaft thereon in combination with means for rotatively advancing the cam shaft intermittently during the knitting of a plurality of courses, other means adapted to cause such cam shaft to stop advancing during the knitting of other courses, and means, at the same time, adapted to be set in motion whereby to control the character of knitting during the knitting of such other courses, retiming means adapted thereafter to resume the advancing movements of the means first mentioned whereby the said means thereafter moves the means second mentioned so that the latter is retimed and moved to a desired circumferential position.

6. A knitting machine provided with a rotary cam shaft for variably controlling the knitting action of the needles, a cam for acting upon the needles, cam means rotatable with the cam shaft and other cam means rotatable independently thereof, means for intermittently rotating the cam shaft and cams mounted thereon and other means for intermittently rotating the second mentioned cam means and while the cam shaft is stationary, which last named means includes a bell crank lever one arm of which is engaged and rocked by a cam of the last mentioned means, a vertically movable member, the upper end of which is connected to the needle actuating cam, engageable with and moved by the other arm of the bell crank lever, whereby when the second mentioned cam means is intermittently rotated the needle engaging cam variably controls the action of the needles.

7. A knitting machine of the independent needle type in combination with cam means movable lengthwise of the needles to fashion the fabric by varying the lengths of the stitches drawn in part at least by the needles, a cam shaft rotatably carried by the machine frame and having cam means mounted thereon adjacent to each end thereof, connections between the two aforesaid cam means and the cam means operable upon the needles whereby to move the said needle cam means lengthwise of the needles, means for intermittently rotating the cam shaft during the knitting of some of the courses when one of the cam means, mounted on the cam shaft, controls the vertical positions of the needle cam means, auxiliary means for advancing the cam shaft while knitting other courses during the knitting of which courses the second mentioned cam means, mounted on the cam shaft, controls the vertical positions of the needle cam.

8. A knitting machine provided with independently movable needles, in combination with cam means adapted to move with respect to the needles and thereby to vary the knitting action of the same, a supporting member depending from the said cam means and means connected to the same adjacent to the other end thereof, a plurality of series of cam engaging members adjustably carried by the said means last mentioned, the upper ends of each series being out of alignment with the other and the cam engaging ends of all of the members being in alignment.

9. In a knitting machine a cam supporting surface having reversible and interchangeable cams mounted thereon said cams each being angular in cross section thereby providing two angularly related portions, one of which serves as a means for attaching the cams to the cam supporting surface and the other of which serves to function as a cam edge or surface, the construction of each said cam permitting the same to be attached to the supporting surface in either of two positions removed 180 degrees from one another.

10. In a knitting machine, a rotatable cam shaft, a ratchet and a cam drum mounted upon the said cam shaft to turn therewith, cams interchangeably mounted upon the cam drum and each being of a length to measure an angle equal to that measured by the distance between adjacent ratchet teeth said cams each being angular in cross section thereby providing two angularly related portions, one of which serves as a means for attaching the cams to the cam supporting surface and the other of which serves to function as a cam edge or surface, the construction of each said cam permitting the same to be attached to the supporting surface in either of two positions removed 180 degrees from one another.

11. A knitting machine having means for varying the stitch length said means including an element rotatable once during the knitting of each stocking, and supplemental means movable independently of the said element for fashioning a portion of each stocking by changing the lengths of the stitches, the element being non-rotatable while the supplemental means varies the stitch length.

12. A knitting machine having movable means for varying the lengths of the knitted stitches, and auxiliary movable means for varying the lengths of the knitted stitches while fashioning a stocking, the movable means first mentioned being stationary while the auxiliary means is movable and operative.

ROBERT H. LAWSON.
ARTHUR N. CLOUTIER.